(12) United States Patent
Ivey et al.

(10) Patent No.: US 10,042,353 B1
(45) Date of Patent: Aug. 7, 2018

(54) PLANT OPERATIONS CONSOLE

(71) Applicant: Southern Company Services, Inc., Atlanta, GA (US)

(72) Inventors: Harvey Velco Ivey, Hayden, AL (US); Derrick Scott Hopper, Calera, AL (US); Earl David Snider, Birmingham, AL (US)

(73) Assignee: SOUTHERN COMPANY SERVICES, INC., Atlanta, GA (US)

( * ) Notice: Subject to any disclaimer, the term of this patent is extended or adjusted under 35 U.S.C. 154(b) by 744 days.

(21) Appl. No.: 14/529,689

(22) Filed: Oct. 31, 2014

Related U.S. Application Data (60) Provisional application No. 62/009,886, filed on Jun. 9, 2014.

(51) Int. Cl.
*G05B 19/418* (2006.01)
*G06F 3/0482* (2013.01)
*G06F 3/0481* (2013.01)
*G06F 3/0484* (2013.01)

(52) U.S. Cl.
CPC ......... *G05B 19/418* (2013.01); *G06F 3/0482* (2013.01); *G06F 3/04817* (2013.01); *G06F 3/04842* (2013.01); *G05B 2219/23258* (2013.01)

(58) Field of Classification Search
CPC ........ G05B 19/418; G05B 2219/23258; G06F 3/0481; G06F 3/0482; G06F 3/0484; G06F 3/04817; G06F 3/04842
See application file for complete search history.

(56) References Cited

U.S. PATENT DOCUMENTS

| | | | | |
|---|---|---|---|---|
| 5,442,746 A | * | 8/1995 | Barrett | G06F 3/0481 715/804 |
| 9,164,649 B2 | * | 10/2015 | Dent | G06F 17/30286 |
| 2009/0083676 A1 | * | 3/2009 | Flanagan | G06F 3/0481 715/853 |
| 2011/0298623 A1 | * | 12/2011 | Lenkeit | G08B 17/117 340/628 |
| 2011/0310126 A1 | * | 12/2011 | Georgiev | G06F 3/016 345/660 |
| 2012/0121229 A1 | * | 5/2012 | Lee | H04N 5/76 386/224 |
| 2014/0040781 A1 | * | 2/2014 | Epstein | H04N 5/268 715/753 |
| 2014/0282257 A1 | * | 9/2014 | Nixon | G05B 11/01 715/835 |
| 2014/0303754 A1 | * | 10/2014 | Nixon | G05B 23/0267 700/83 |
| 2015/0091778 A1 | * | 4/2015 | Day | G06F 3/1446 345/1.3 |

* cited by examiner

*Primary Examiner* — Umut Onat
(74) *Attorney, Agent, or Firm* — Thomas Horstemeyer, LLP (57) ABSTRACT

Disclosed are various embodiments for optimizing how operators of facilities view and monitor data on displays via an operations console. A display hierarchy may be employed to facilitate access by an operator to relevant information concerning plant operations. Information may be classified and rendered on a display. An operator may navigate between the displays via interacting with a navigation menu located on a display.

20 Claims, 7 Drawing Sheets

PLANT OPERATIONS CONSOLE

CROSS-REFERENCE TO RELATED APPLICATION

This application claims the benefit of U.S. Provisional Application No. 62/009,886, filed Jun. 9, 2014 and entitled Optimizing Operator Displays, which is incorporated herein by reference in its entirety.

BACKGROUND

The view that an operator has of the process he or she is responsible for controlling has changed significantly over the past few decades. Initially, operators were presented with many individual indicators carefully arranged across vertical or half-height bench boards to give the operator an organized view of an entire process. With the introduction of distributed control systems (DCS), engineers were provided with a host of new capabilities including the ability to present information to operators in an entirely new way. Unfortunately, these new capabilities were not necessarily applied with the same careful attention to the operators' perspective as the original controls enjoyed. One significant change in this transition was the loss of the "big picture" as the process was "chopped" into smaller pieces that would more conveniently fit the landscape available on computer monitors. The transition to the world of digital controls also included the loss of trending in many cases, which was valuable to an operator in the analog world and still should be today.

Over the course of the past few years, often as the result of unfortunate events, industry has realized the need to focus greater attention on presenting "information" to our operators, not just "data." This recent awakening to the importance of how we present information to operators has generated a movement within the industry toward better graphical presentation of information, improvement of ergonomic design, and even more focus on how we design control rooms. The intent of all these changes has been to equip the operator with better tools and a better environment to allow a more effective performance, which is critical to the success of any facility.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same. Embodiments of the present disclosure include hardware components comprising a plant operations console and computing infrastructure that facilitates optimal ways for an operator to monitor and manipulate data. The hardware components may include a plurality of displays arranged in a hierarchy for viewing and monitoring by an operator, computing devices, and other components as will be described herein. The computing infrastructure may provide the operator with the ability to simultaneously manipulate and monitor several processes, units, and/or sub-units under his or her control. Accordingly, embodiments of the present disclosure allow an operator to monitor and manipulate plant operations from a plant operations console via a display hierarchy.

Figure 1:
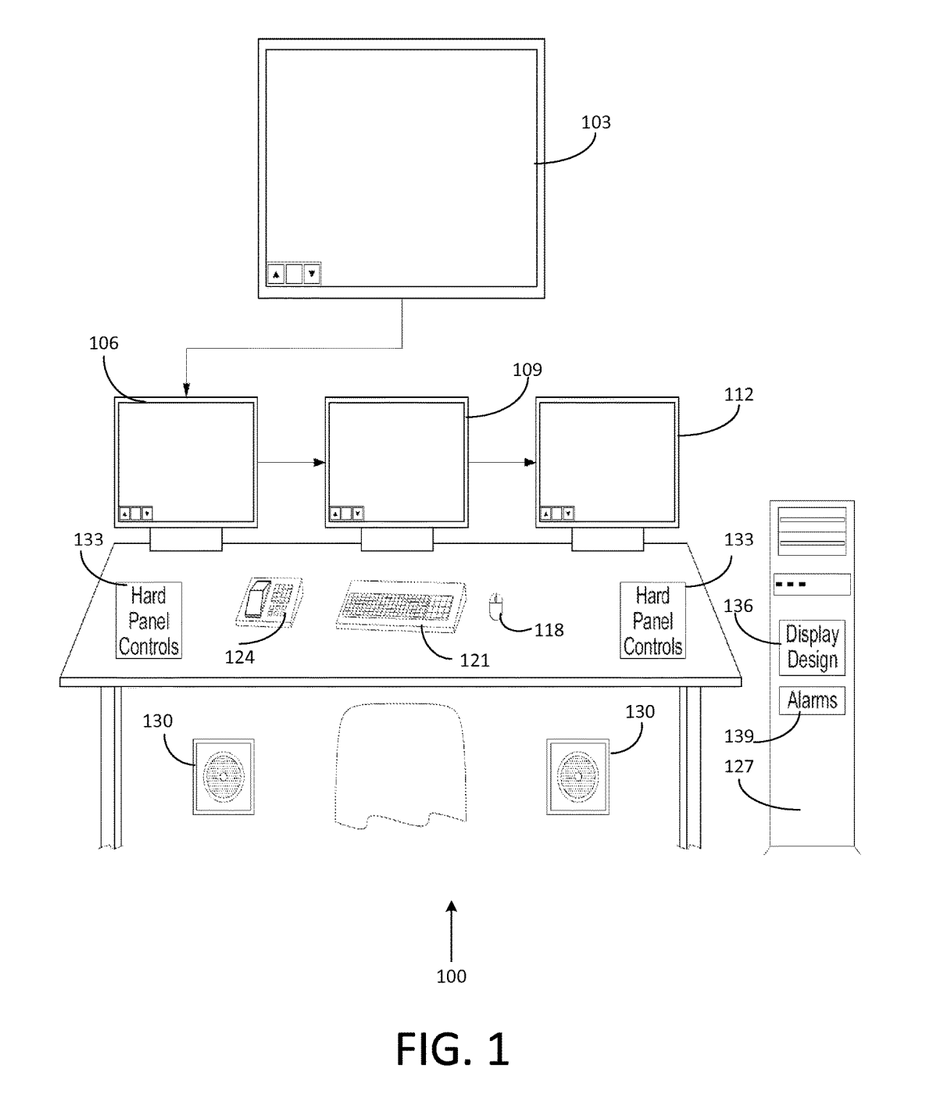
FIG. 1 is a drawing of the plant operations console according to various embodiments of the present disclosure.

With reference to FIG. 1, shown is a plant operations console 100 according to various embodiments. It should be appreciated that embodiments of the present disclosure can be implemented in various ways. For example, a room may include a single plant operations console 100. Alternatively, one room could house many adjacent plant operations consoles 100. The plant operations console 100 includes displays, which facilitate viewing of the plant by an operator. The plant operations console 100 includes at least a top level display 103, a second level display 106, a third level display 109, and a fourth level display 112. The displays may be physically arranged as a hierarchy within the plant operations console 100. According to various embodiments, each display 103, 106, 109, and 112 may include a navigation toolbar 115, which allows an operator to navigate between the different display levels. The plant operations console 100 includes a computing device 127. The plant operations console 100 also includes several input devices. Input devices may be for example, a pointing device 118, a keyboard 121, a specialized keyboard 124, or any combination thereof. According to various embodiments, the plant operations console 100 may also include several speakers 130 to interact with the alarms application 139 and other applications. The plant operations console 100 may also include hard panel controls 133. Hard panel controls 133 may be, for example, turbine trip pushbuttons.

Each display 103, 106, 109, and 112 may display data to represent the physical aspects of the plant, the process, and control systems. Since the displays 103, 106, 109, and 112 are used as the primary tools for operators to obtain information about the systems under their control, they are the core of all plant operations console 100 designs. The number of each type of display 103, 106, 109, and 112 that is required may be a function of the graphical display design, requirements from different systems, and the operator's workload. Display designs may be derived from a combination of information requirements, limits on system/data loading, human perception, and information processing limits. These factors may dictate the navigation scheme and hierarchy as well as the number, type, and content of the displays 103, 106, 109, and 112.

The displays 103, 106, 109, and 112 should be designed to provide the proper presentation and level of information to support the range of human-machine system interactions through the displays 103, 106, 109, 112 and input devices 118, 121, and 124. The set of displays 103, 106, 109, and 112 created for operator tasks should have a meaningful structure that affords logical navigation actions. Typically, mimicking the physical or functional structure of the process and control scheme can enable achievement of this result. However, special consideration should be given to key controllers and indicators for common and critical operating scenarios to ensure unnecessary navigation is avoided (i.e., minimal keystrokes). To the extent possible, the displays 103, 106, 109, and 112 should display multiple types of information in order to limit the number of display types necessary to support the operator tasks, and the consequent need to navigate between displays 103, 106, 109, and 112. To this end, the same set of displays 103, 106, 109, and 112 may be used for normal and abnormal operations.

According to various embodiments, the plant operations console 100 may include four levels in a display hierarchy to be sufficient and effective. The top level displays 103 may be, for example, wall screens. The second level displays 106, third level displays 109, and fourth level displays 112 may be desktop console screens. According to various embodiments, each level of display 103, 106, 109, 112 may display a unique type of information relative to another level. Information may be arranged in the displays 103, 106, 109, and 112 to support simultaneous viewing and interaction requirements that are needed for critical monitoring and control tasks. Display layouts should capitalize on maximizing an operator's retention of information in short-term memory.

According to various embodiments, the four levels of the display hierarchy may be defined according to a screen size of each display 103, 106, 109, and 112 and location with respect to the operator as well as the type of information content presented on the screen. For example, a span of control overview displays may reside on the large wall screens corresponding to top level displays 103. Since the top level displays 103 may be a significant distance from the operator, the top level displays 103 should be used to present monitoring information of a qualitative nature and not detailed information that would be associated with control actions. The screens corresponding to second level displays 106, third level displays 109, and fourth level displays 112 located on the console, closer to the operator, may be used to present quantitative display objects and/or operating displays that require direct operator interaction. A maximum hardware configuration of five display devices per operator for normal operations is recommended. In an exemplary embodiment, a hardware configuration of five display devices consists of a top level display 103, two second level displays 106, a third level display 109, and a fourth level display 112. For non-routine operations such as startup, an additional two display devices may be provided for a second operator.

The computing device 127 may comprise, for example, a server computer or any other system providing computing capability. Alternatively, a plurality of computing devices 127 may be employed that are arranged, for example, in one or more server banks or computer banks or other arrangements. For example, a plurality of computing devices 127 together may comprise a cloud computing resource, a grid computing resource, and/or any other distributed computing arrangement. Such computing devices 127 may be located in a single installation or may be distributed among many different geographical locations. For purposes of convenience, the computing device 127 is referred to herein in the singular. Even though the computing device 127 is referred to in the singular, it is understood that a plurality of computing devices 127 may be employed in the various arrangements as described above.

The components executed on the computing device 127, for example, include a display design application 136, an alarms application 139, and other applications, services, processes, systems, engines, or functionality not discussed in detail herein. The display design application 136 is executed to provide mechanisms by which operators can access data pertaining to how plant operations, processes, and equipment are depicted. Accordingly, the display design application can generate interfaces that can be accessible by an operator in order to define how data is depicted is in the displays 103, 106, 109, and 112. The alarms application 139 is executed to monitor statuses of and updates to alarms.

According to various embodiments, an operator may navigate between the displays 103, 106, 109, and 112 by employing at least one input device which may include a pointing device 118, a keyboard 121, and/or a special keyboard 124. The pointing device 118 may comprise for example, a mouse, a trackball or any other device that supports navigation by pointing, as may be appreciated. In various embodiments, the pointing device 118 may have Universal Serial Bus (USB) connection. The pointing device 118 may allow the operator to navigate displays 103, 106, 109, and 112 via pointing, clicking, double clicking, pressing, and dragging or any combination thereof as may be appreciated.

According to various embodiments, a single keyboard 121 may be used to operate on multiple displays 103, 106, 109, and 112. In one exemplary embodiment, one keyboard 121 is used for every 2 displays 103, 106, 109, and 112. The single keyboard 121 may be a standard keyboard or a specialized keyboard 124. According to various embodiments, the specialized keyboard 124 may include a set of shortcut keys with predefined actions assigned. In one embodiment, the specialized keyboard 124 includes a key that can be set up so that a Light-Emitting Diode (LED) on that key blinks or changes color when a point goes into alarm. To this end, when an operator presses the key, an associated display is called up for the point in alarm.

According to various embodiments, several methods of navigation may be provided to the operator. A navigation toolbar 115 may be located on each display 103, 106, 109, and 112. In other embodiments, a navigation toolbar 115 may only be located on each second level display device 106 and each third level display device 109. Selecting the navigation toolbar 115 facilitates quick access to the top level displays 103 and easy access to information on second level displays 106, third level displays 109, fourth level displays 112, and other associated information as may be appreciated. Since navigation via a keyboard 121 may be minimal at best, the operators may have to rely primarily on screen based navigation via the navigation toolbar 115.

By selecting the navigation toolbar 115, an operator may access a navigation menu which may allow direct access to individual displays from any workstation. According to various embodiments, the navigation menu consists of a hierarchical tree structure. The navigation menu should list all areas within the span of control of a plant operations console 100. To navigate to a desired display, the operator may select the desired display's name from the navigation menu.

The navigation toolbar 115 may consist of three buttons. Selecting a MAIN MENU button may allow the operator to access the navigation menu. Selecting UP and DOWN arrow buttons may allow the operator to cycle through icons representing third level display 109 under a selected menu branch representing a second level display 106. Display targets may be used to allow navigation from one display to another. In some embodiments, navigation target buttons at the start and end of each process piping line for those lines that continue onto another display are provided. These navigation target buttons facilitate navigation to named displays. They may also provide operators with a sense of process continuity. Display targets may have a darker background color so that operators can identify an object as a navigation target.

The color scheme for each display 103, 106, 109, and 112 should be chosen to support increased lighting levels, which increases vigilance, decreases eye strain, and improves prominence of critical information. Therefore, the placement and orientation of the displays 103, 106, 109, and 112 as well as the overall control room lighting must support this design in order to gain maximum benefit. According to various embodiments, the following colors are reserved for alarms in all displays 103, 106, 109, and 112: Alarm Red is reserved for High Priority Alarms (Priority 1). Alarm Yellow is reserved for Medium Priority Alarms (Priority 2). Alarm Cyan is reserved for Low Priority Alarms (Priority 3). Alarm Magenta is reserved for Input Failures (Bad Quality).

According to various embodiments, a full intensity color will be used only for critical information, such as alarms. Gray scale and subdued colors may be used to depict equipment, flow lines, and normal operations. Background colors of all process displays will be background gray. According to various embodiments, the colors used to indicate alarms should not be used for any other purpose. Color may be used redundantly. Consistent color coding schemes should be used. Color codes that have conflicts with cultural stereotypes and industry standards should be avoided.

According to various embodiments, the displays 103, 106, 109, and 112 must be designed to accommodate color deficiencies because control room operators may not be tested for color deficiencies. Because the most common color deficiency is dichromatism, which means lacking the ability to differentiate green-yellows and yellow-reds, red/green, green/yellow, and white/cyan color combinations that have the same saturation and brightness levels should be avoided. If such color combinations are unavoidable, then the saturation and brightness of the individual colors should vary to produce distinctions when displayed in gray-scale.

According to various embodiments, displays 103, 106, 109, and 112 may employ means other than colors to help an operator differentiate and understand the information being presented. One example of this is redundant coding. Redundant coding refers to the practice of using alternate, redundant means to convey the same information. One example of redundant coding is the familiar "STOP" traffic sign. A "STOP" sign is triply redundant because it is red, it is always octagonal, and it has the word "STOP." Therefore, someone who is color deficient and even unfamiliar with the English language can still easily understand the meaning of the sign. However, all information does not have to be triply coded. Although, some redundancy may be required for critical information, as may be appreciated.

According to various embodiments, the following color standards are applied to the use of color: The number of color codes should be kept to a minimum and consistently applied across all displays 103, 106, 109, and 112. Color combinations may be composed of individual colors that provide sufficient contrast when objects with those colors are adjacent to or layered onto one another. Accordingly, this ensures that distinctions can be made between the objects if the displays 103, 106, 109, and 112 were to be depicted in gray-scale. Brightness coding may be used sparingly for salience coding. Full-intensity colors or a high level of brightness may be limited to coding conditions or information of high importance, which must be prominent relative to other items in the same display. "Normal" operating conditions are less conspicuous than alarm conditions. Gray-scale should be used for equipment and instrumentation. Mnemonic features of displays 103, 106, 109, and 112 are the least salient items. According to various embodiments, line thickness may be used to convey the significance of a process flow. A primary process flow should be conveyed by a line thickness that is twice as thick as a secondary process flow. A secondary process flow should be conveyed by a line thickness that is twice as thick as a tertiary process flow.

According to various embodiments, alarm types may be High, Medium, or Low. Each alarm type should display at least two states, unacknowledged and acknowledged. Unacknowledged alarm states should be the most visually salient feature on a display 103, 106, 109, or 112. Unacknowledged alarm states should be depicted with full intensity color. Acknowledged alarms should be depicted with a half intensity color. Specific operator interaction with the alarm states may depend on the decisions made about the control zone and keyboard 121. Provided the alarm on a display 103, 106, 109, or 112 has focus, i.e. is selected, manual operation of an acknowledge button satisfies both an audible alert and a visible alert by silencing the audible alert and freezing the visible alert. For high priority alarms both audible and visible alerts should activate each time a new event is detected. A "horn" silence feature, such as soft button should be provided to suppress an audible alert by priority for a prescribed interval (e.g., 15 minutes) after which time the audible alert automatically reactivates. The alarms may be indicated through an alarm banner located on a display 103, 106, 109, or 112 and may be sorted by priority. A horn and indications on the display 103, 106, 109, or 112 may also be used. According to various embodiments, alarms may also be shown on an alarm summary display, located on a display 103, 106, 109, or 112.

According to various embodiments, information may be represented by analog representation, when appropriate. Primary process flows may be presented in a display 103, 106, 109, or 112 from left to right and from top to bottom when appropriate. Objects and icons that may have an associated operator interaction should be distinguishable from objects and icons that are static. According to various embodiments, only static equipment and vessels critical for understanding a process may be included in displays 103, 106, 109, and 112.

According to various embodiments, both audible and visible alerts should be used to bring a new event to the plant operations console operator's attention and, provided the new event on display has focus, manual operation of an acknowledge button should satisfy both alerts (i.e., silence the audible alert and freeze the visible alert). The sound characteristic of the audible alert should be unique by priority and unique to a plant operations console 100. The alert may be activated each time a new event is detected. A "horn" silence feature, such as soft button, should be provided to suppress an audible alert by priority for a prescribed interval (e.g., 15 minutes) after which time the audible alert automatically reactivates.

According to various embodiments, audible alerts should be at a sound level that ensures the alert will be perceived, but not so loud that it startles or prevents verbal (in room and radio) communication. In an exemplary embodiment, an audible alert should sound at a range that is 10-25 dB above the ambient room noise level. Approximately 12 different auditory warnings may be used. If the number of different auditory warnings is too large, the warnings may mask each other as well as increase the overall noise level of the room. For specific emergency alarms, the use of informative voice based alarms may be employed. If used, however, these should be context-based and concise. There should be no confusion as to the action to be taken as a result of the alarm. For example, the use of spoken "Emergency Alarm" is not recommended, whereas, "Emergency Alarm Evacuate Control Room" is.

According to various embodiments, all control room systems that deliver audio to the consoles (alarm system, radio system, PA system) may be managed through a common interface and delivered through a single set of speakers to allow each operator to control the volume levels individually, to provide high quality sound at low levels, and to allow automatic reduction in volume of other systems when higher priority alarm or radio system sound is active. This will prevent "volume creep" and help maintain overall sound levels in the control room at comfortable levels.

According to various embodiments, visual alerts may be used to identify a status of high, medium, and low priority events. Each priority level should be assigned a specific color indicator. For example, high priority events may be indicated by a red color, medium priority events may be indicated by a yellow color, and low priority events may be indicated by a cyan color. In some embodiments, visible alerts may be removed from a display 103, 106, 109, or 112 once the condition has cleared, but only after the event has been acknowledged. Each priority level may also be associated with a number and a symbol. For example, a high priority alarm may be represented by a "1" and a diamond, a medium priority alarm may be represented by a "2" and a square, and a low priority alarm may be represented by a "3" and a circle. According to various embodiments, unacknowledged alarms may be displayed in full intensity of the alarm priority color, while acknowledged alarms may be displayed in half intensity of the alarm priority color. Disabled or inhibited alarms may be indicated by the text character "D" where a priority symbol would normally appear. Suppressed alarms may be indicated by the text character "S" where a priority symbol would normally appear.

Figure 2:
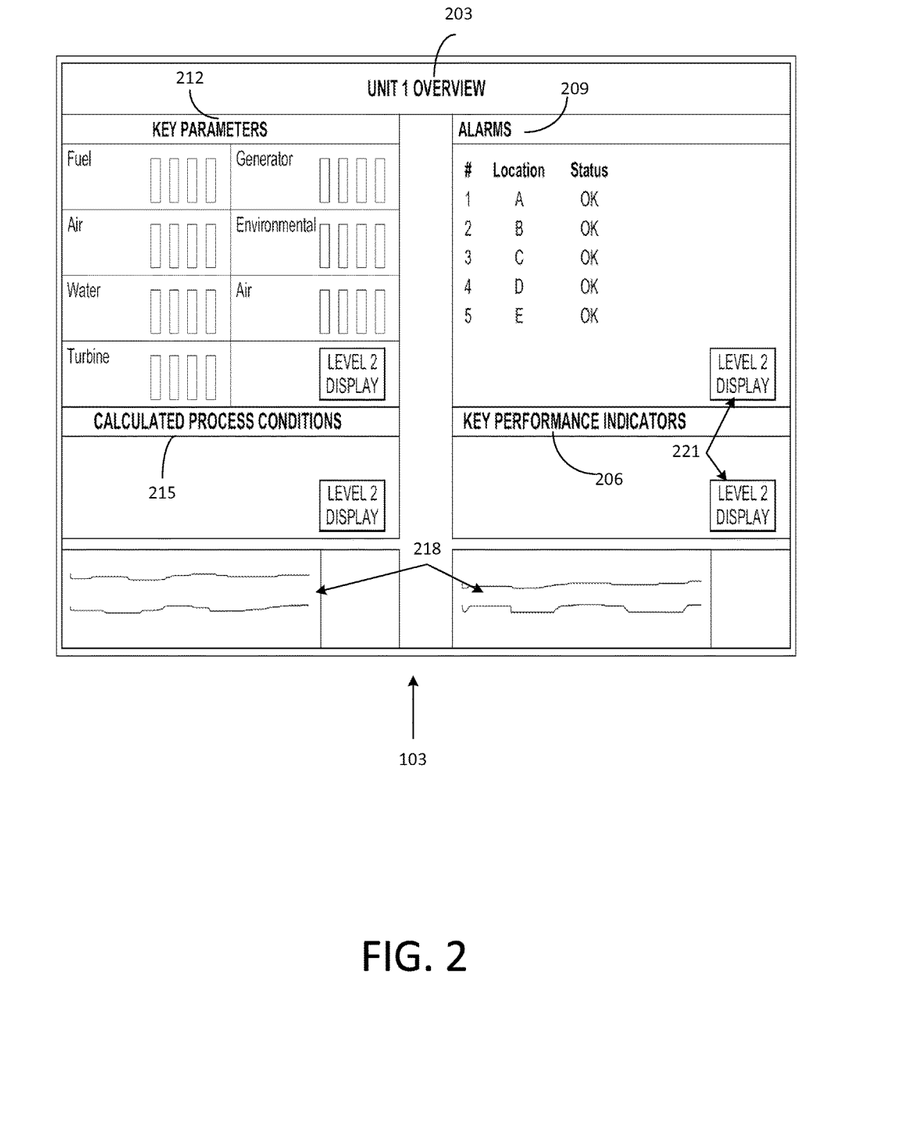
FIG. 2 is a drawing of an example of the type of information rendered in a top level display in the plant operations console of FIG. 1 according to various embodiments of the present disclosure.

With reference to FIG. 2, shown is an example of a top level display 103 according to various embodiments of the present disclosure. According to various embodiments, top level display devices 103 are primarily used to present qualitative information used by the operators to monitor their processes and units and to provide an operator, at a glance, an indication of the operating state of all units under his/her control. The top level display 103 may include several different types of graphics. Graphics included in the top level displays 103 may include unit overview displays 203 which contain key performance indicators graphics 206, key parameters graphics 212, calculated process conditions graphics 215, alarms graphics 209, trending graphics 218, and yoking graphics 221. In alternative embodiments, a top level display 103 may display an overview for an operator's span of control which can include more than one unit overview display 203 for a single operator. This large span of control display may be visible or readily accessible to the operator at all times.

The unit overview display 203 should be useable for all operating conditions such as start up, shut down, and any other operating condition as may be appreciated. According to various embodiments, more than one unit overview display 203 may be needed to support certain operating conditions such as start up. In the case of multiple unit overviews 203 being used for special operating scenarios, the layout, orientation, and overall look and feel should not significantly vary between the different unit overview 203 displays for an operator workstation. Unit overviews 203 displayed in the top level displays 103 often require more screen real estate than the second level displays 106, third level displays 109, and fourth level displays 112. Thus, according to various embodiments, the top level displays 103 comprise wall screens. In an exemplary embodiment, a unit overview display 203 that represents an operator's span of control should be presented on one continuous screen, not divided between several screens. Since these unit overview displays 203 are often heavily loaded, they should not need to be replaced and called up frequently. According to various embodiments, displays within a top level display 103, such as trending displays 218 which may change based on operating conditions may also be displayed as part of the top level display 103, but should not replace the unit overview display 203. In some embodiments, trend displays 218 may also be available on second level displays 106, third level displays 109, and fourth level displays 112.

According to various embodiments, key parameters graphics 212 may include various information related to fuel, air, water, turbines, generators, and the environment. Calculated process conditions graphics 215 may depict the health of high-level process areas such as a furnace, turbine, boiler, or any other high-level process areas as may be appreciated. The calculated process conditions graphics 215 may use icons to indicate actual values, abnormal statuses, and a severity of deviation from the norm. In some embodiments, the calculated process conditions graphic 215 includes an icon that when selected, accesses deviation values, directions of change indications, and trends. Alarms graphics 209 should include an alarm identifier, a location of the alarm, and a status of the alarm. Key performance indicator graphics 206 may include indicators for heat rate, generated megawatts, stack opacity, emission levels for NOx, and AGC statuses and limits. An operator may select a yoking graphic 221 to make a corresponding second level display 106 appear on the desktop screens. According to various embodiments, the trending graphics 218 may display fixed trends and ad-hoc trends. Fixed trends include trends that are embedded in process graphics or as part of a top level display 103. Ad-hoc trends are trends that the operator may configure as required for monitoring or analyzing the behavior of process variables.

Figure 3:
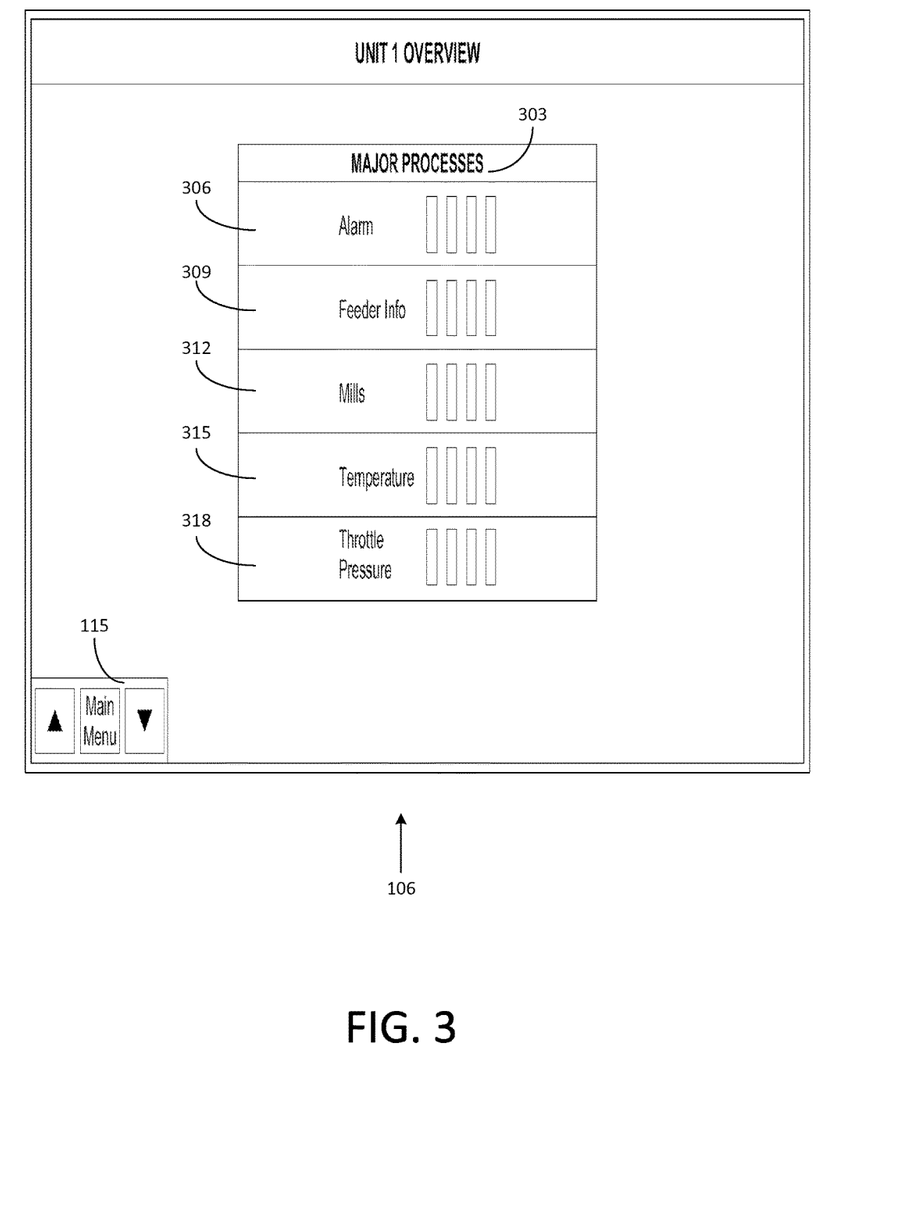
FIG. 3 is a drawing of an example of the type of information rendered in a second level display in the plant operations console of FIG. 1 according to various embodiments of the present disclosure.

With reference to FIG. 3, shown is an example of a second level display 106 according to various embodiments of the present disclosure. According to various embodiments, second level displays 106 may be considered as the operator's primary operating displays. Second level displays 106 include task-oriented graphics such as alarm oriented graphics 306, feeder info graphics 309, mills graphics 312, temperature graphics 315, and throttle pressure graphics 318 to allow operations to quickly detect, diagnose, and respond to a pending situation. The alarm-oriented graphics 306 include displays for all high, medium, and low priority alarms.

Second level displays 106 provide the operator with a means of quickly determining the health of a major process 303 or system within their span of control. In some embodiments, level two displays 106 include multiple major processes 303 controlled by an operator. To this end, second level displays 106 are a critical link between the top level displays 103 and the more detailed third level displays 109. In some embodiments, there are many similarities between certain second level displays 106 and unit overview displays 203. However, according to various embodiments, second level displays 106 will typically contain more detailed functional and control-specific information. Accordingly, separation between top level displays 103, second level displays 106, and third level displays 109 is based on task and information requirements, system performance, as well as screen real estate.

Figure 4:
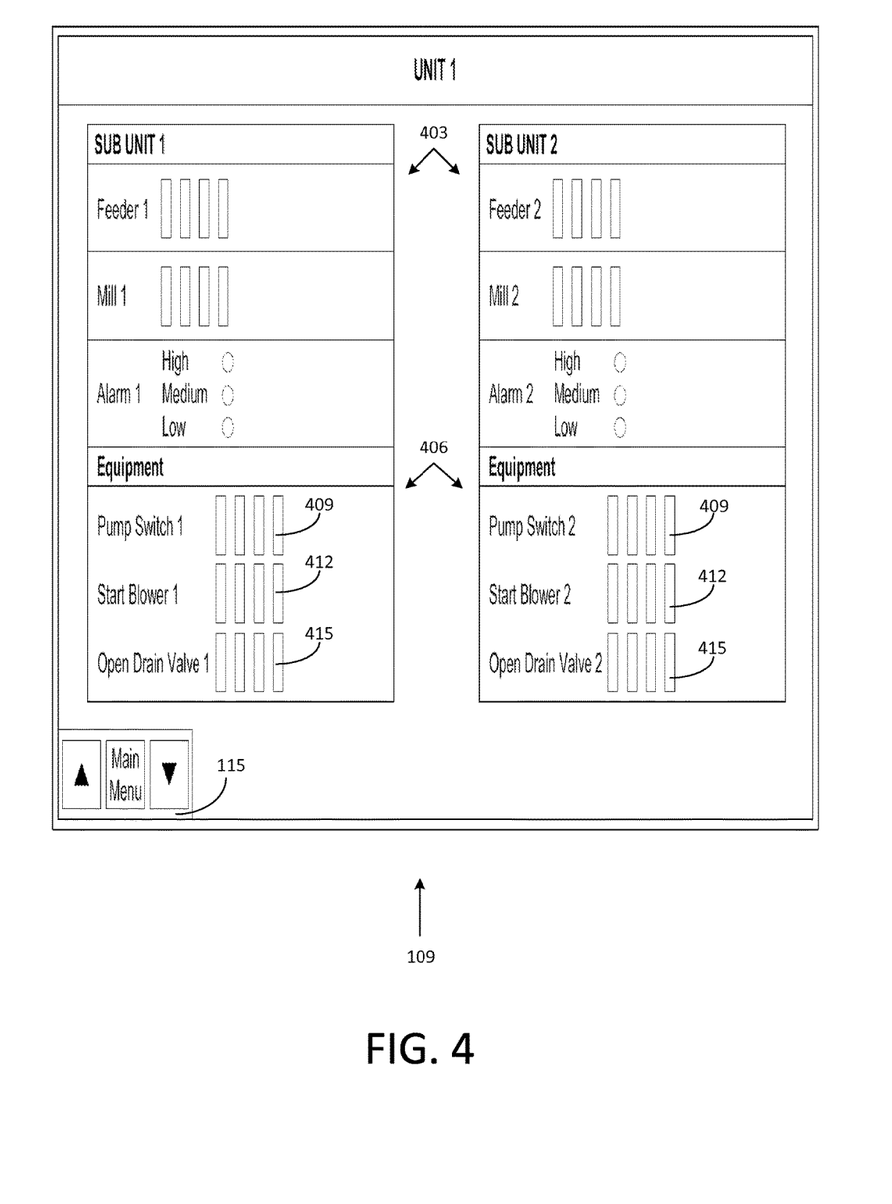
FIG. 4 is a drawing of an example of the type of information rendered in a third level display in the plant operations console of FIG. 1 according to various embodiments of the present disclosure.

With reference to FIG. 4, shown is an example of a third level display 109 according to various embodiments of the present disclosure. According to various embodiments, third level displays 109 may provide detailed information that may not be displayed on the second level displays 106. According to various embodiments, third level displays 109 include displays that provide detailed views of sub units 403, equipment 406, and related controls and indications. Third level displays 109 may be used to display routine operations, such as switching of pumps, starting blowers, opening drain valves and so forth. Accordingly, third level displays 109 include pump switch graphics 409, blower graphics 412, and drain valve graphics 415. In some embodiments, third level displays 109 may also be used for detailed diagnostics in interventions that are not time-critical.

Figure 5:
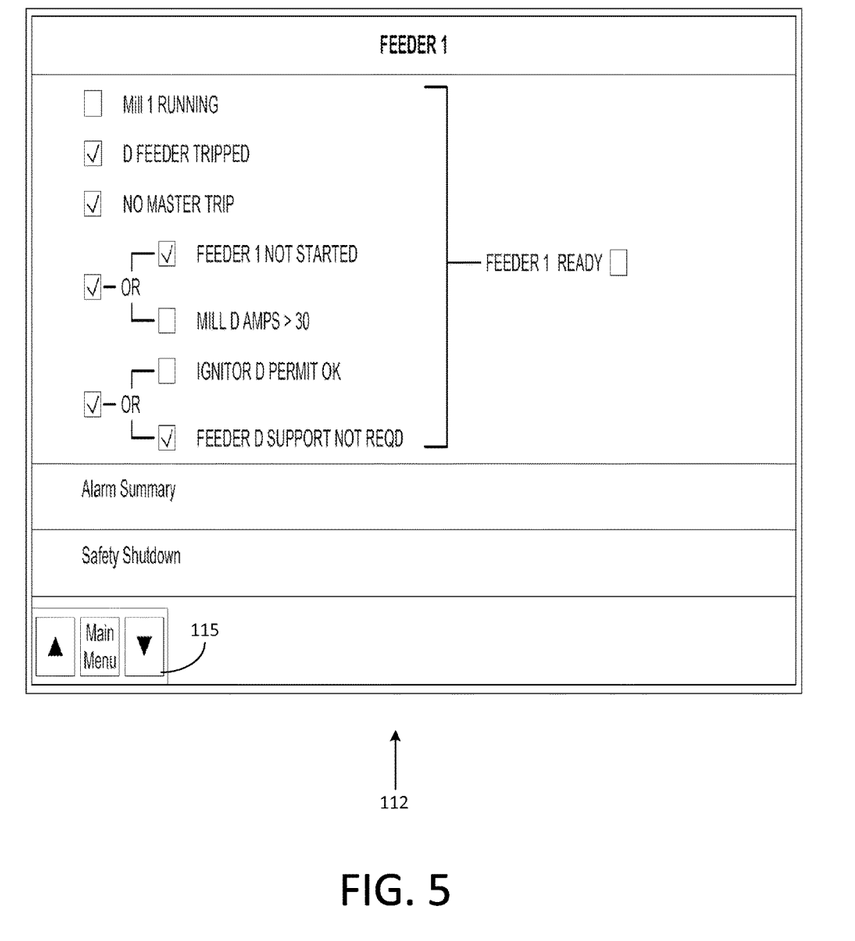
FIG. 5 is a drawing of an example of the type of information rendered in a fourth level display in the plant operations console of FIG. 1 according to various embodiments of the present disclosure.

With reference to FIG. 5, shown is an example of a fourth level display 112 according to various embodiments of the present disclosure. According to various embodiments, the fourth level displays 112 are the lowest level within the hierarchy of displays. Fourth level displays 112 provide additional or miscellaneous information that may be useful for operating a particular section or piece of equipment within a unit. According to various embodiments, fourth level displays 112 do not contain control functions. Fourth level displays 112 include dynamic interlock displays and permissive status displays for every interlock and permissive in the control logic design. According to various embodiments, conditions that must be met and the values associated with interlocks and permissives should be easily accessible to an operator via fourth level displays 112. Access to information about the detailed logic of interlocks and permissives provides an operator with the detailed reasoning behind the relationships. Showing these constraints to operators provides greater situational awareness of the context, equipment relationships and actions available to satisfy safety and operating constraints.

Figure 6:
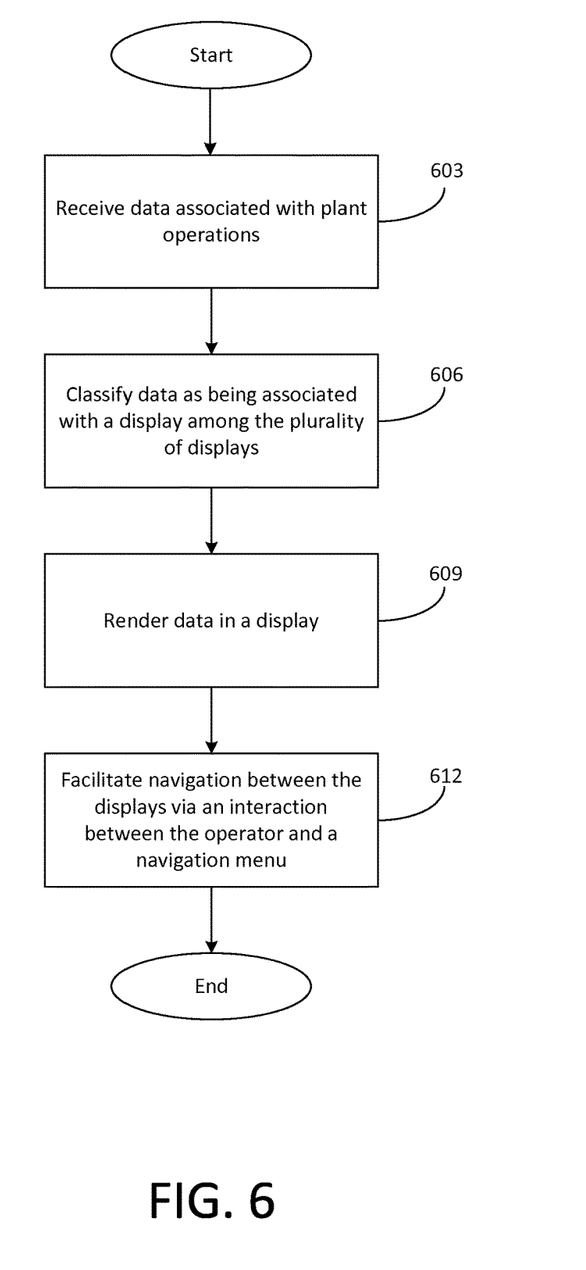
FIG. 6 is a flowchart illustrating an example of functionality implemented by the computing device of FIG. 1 according to various embodiments of the present disclosure.

With reference to FIG. 6, shown is a flowchart that provides an example of the operation of a portion of the computing device 127 according to various embodiments. It is understood that the flowchart of FIG. 6 provides merely an example of the many different types of functional arrangements that may be employed. As an alternative, the flowchart of FIG. 6 may be viewed as depicting an example of steps of a method implemented in the computing device 127 according to one or more embodiments.

In box 603, the computing device 127 may receive data associated with plant operations. The data may be received from sensors or other monitoring devices associated with operations, processes, or equipment. Next, in box 606, the computing device 127 classifies the data as being associated with a display 103, 106, 109, or 112. Then, in box 609, the computing device 127 causes data to be rendered in a display 103, 106, 109, or 112. In box 612, the computing device 127 facilitates navigation between the displays 103, 106, 109, and 112 via an interaction between the operator and a navigation menu.

Figure 7:
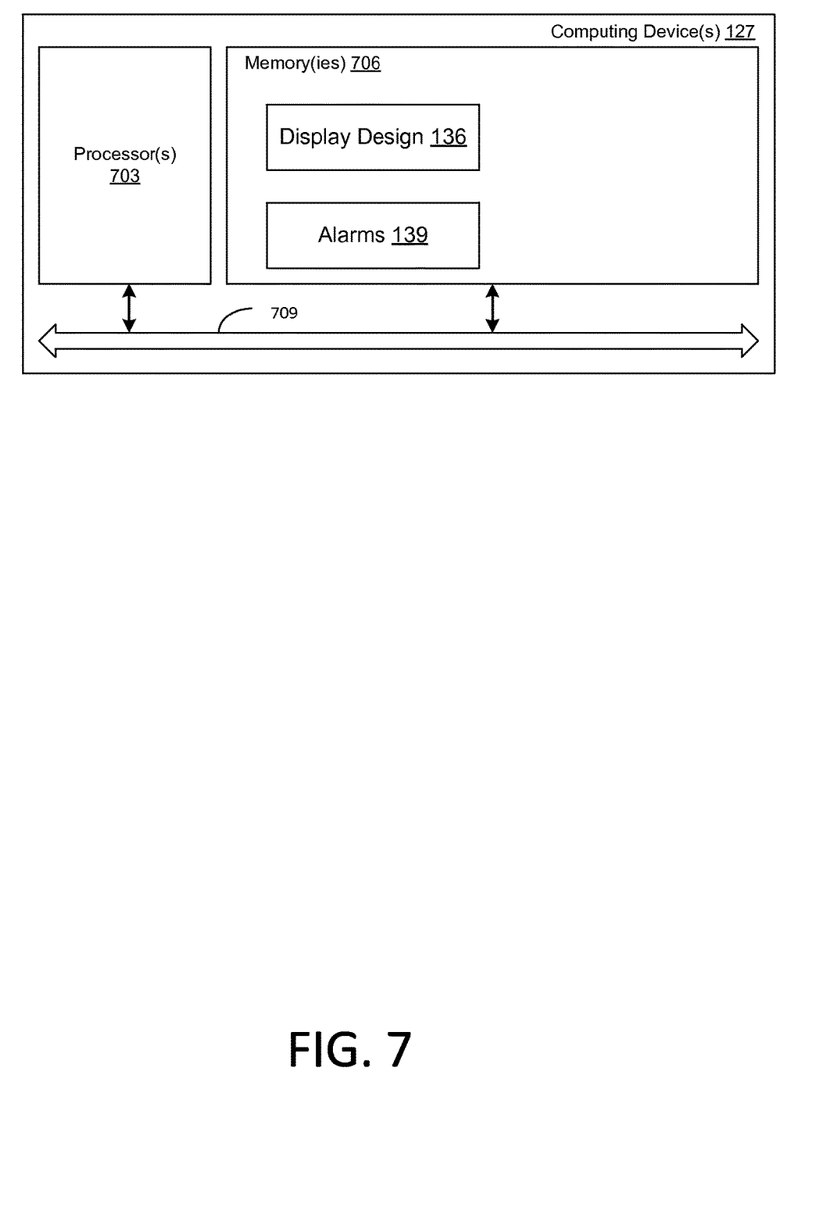
FIG. 7 is a schematic block diagram that provides one example illustration of a computing device employed in the plant operations console of FIG. 1 according to various embodiments of the present disclosure.

With reference to FIG. 7, shown is a schematic block diagram of the computing device 127 according to an embodiment of the present disclosure. Each computing device 127 comprises at least one processor circuit, for example, having a processor 703 and a memory 706, both of which may be coupled to a local interface 709. To this end, each computing device 127 may comprise, for example, at least one server computer or like device. The local interface 709 may comprise, for example, a data bus with an accompanying address/control bus or other bus structure as can be appreciated.

Stored in the memory 706 are both data and several components that are executable by the processor. In particular, stored in the memory 706 and executable by the processor 703 are the display design application 136, the alarms application 139 and potentially other applications. Also stored in the memory may be a data store and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories that operate in parallel processing circuits, respectively. In such a case, the local interface may be an appropriate network that facilitates communication between any two of the multiple processors 703, between any processor 703 and any of the memories 706, or between any two of the memories 706, etc. The local interface may comprise additional systems designed to coordinate this communication, including, for example, performing load balancing. The processor may be of electrical or of some other available construction.

Although the display design application 136, alarms application 139, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the application, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 127, or in multiple computing devices 127 in a same computing environment. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A plant operations console comprising:
    a plurality of display devices that are arranged to support simultaneous viewing by an operator;
    a plurality of input devices comprising at least a keyboard device and a pointing device; and
    a non-transitory computer-readable medium embodying at least one program executable in at least one computing device, the at least one program having instructions that perform a method comprising:
        determining a display hierarchy for the plurality of display devices based on a screen size of a respective display device, a location of the respective display device with respect to the operator, and a type of information displayed, the display hierarchy comprising an assignment of one of a plurality of levels to individual ones of the plurality of display devices;
        receiving, by the at least one computing device, information from a plurality of devices;
        classifying, by the at least one computing device, the information as being associated with a level among the plurality of levels, the level corresponding to a first display device among the plurality of display devices;
        rendering, by the at least one computing device, the information in the first display device that corresponds with the level assigned for the information; and
        transferring, by the at least one computing device, the information displayed in the first display device to a second display device of the plurality of display devices in response to receiving user input on a navigation menu rendered on the second display device, the navigation menu being rendered in at least two of the plurality of display devices.

2. The plant operations console of claim 1, wherein the navigation menu depicts a hierarchical tree structure, the hierarchical tree structure corresponding to the display hierarchy.

3. The plant operations console of claim 1, wherein the display hierarchy comprises four levels, and wherein information associated with a top level among the four levels is rendered in a display corresponding to a wall screen and information associated with remaining levels among the four levels is rendered in a display corresponding to a desktop console screen.

4. A system comprising:
a plurality of display devices that are arranged to provide simultaneous viewing by an operator; and
a non-transitory computer-readable medium embodying at least one program executable in at least one computing device, the at least one program having instructions that perform a method comprising:
determining a display hierarchy for the plurality of display devices based on a screen size of a respective display device, a location of the respective display device with respect to the operator, and a type of information displayed, the display hierarchy comprising an assignment of one of a plurality of levels to individual ones of the plurality of display devices;
receiving, by the at least one computing device, information from a plurality of components, the information corresponding to data associated with at least one component among the plurality of components;
classifying, by the at least one computing device, the information as being associated with a level among the plurality of levels, the level corresponding to a first display device among the plurality of display devices;
rendering, by the at least one computing device, the information in the first display device that corresponds with the level assigned for the information; and
transferring, by the computing device, the information displayed in the first display device to a second display device of the plurality of display device in response to receiving user input on a navigation menu rendered on the second display device, the navigation menu being rendered in at least two of the plurality of display devices.

5. The system of claim 4, wherein the at least one component is an alarm.

6. The system of claim 5, wherein the information includes at least one alarm status, the alarm status being categorized by a priority among a hierarchy of priorities, wherein each priority is associated with a unique full intensity color.

7. The system of claim 4, wherein the at least one component includes equipment, flow lines, and normal operations, and the information relating to data associated with the at least one component is depicted in the second display device by a subdued color.

8. The system of claim 4, wherein each display is designed to accommodate a user with dichromatism by avoiding depicting color combinations that have a same saturation and brightness level.

9. The system of claim 4, wherein the display hierarchy comprises four levels, and wherein information associated with a top level among the four levels is rendered in at least one display device corresponding to a wall screen and information associated with remaining levels among the four levels is rendered in at least one display device corresponding to a desktop console screen.

10. A method of monitoring data from an operator console, the data being associated with plant operations and being depicted on a plurality of display devices, the method comprising:
determining, via at least one computing device, a display hierarchy for the plurality of display devices based on a screen size of a respective display device, a location of the respective display device with respect to an operator, and a type of information displayed, the display hierarchy comprising an assignment of one of a plurality of levels to individual ones of the plurality of display devices;
receiving, via the at least one computing device, information from a plurality of plant components, the information corresponding to data associated with at least one plant component among the plurality of plant components;
classifying, via the at least one computing device, the information as being associated with a level among the plurality of levels, the level corresponding to a first display device among the plurality of display devices in the display hierarchy;
rendering, via the at least one computing device, the information in the first display device that corresponds with the level assigned for the information; and
transferring, via the at least one computing device, the information displayed in the first display device to a second display device of the plurality of display devices in response to receiving user input on a navigation menu rendered on the second display device, the navigation menu being rendered in at least two of the plurality of display devices.

11. The method of claim 10, wherein the display hierarchy comprises four levels, and wherein information associated with a top level among the four levels is rendered in the first display device corresponding to a wall screen and information associated with remaining levels among the four levels is rendered in a third display device corresponding to a desktop console screen.

12. The method of claim 11, wherein the information associated with the top level comprises qualitative information used to monitor processes and units.

13. The method of claim 11, wherein the information rendered in the first display device corresponding to the wall screen depicts operating states of all units under control of the operator.

14. The method of claim 11, wherein the information rendered in the second display device corresponding to a desktop console screen is associated with a second level among the four levels and the second display device corresponding to the desktop console screen depicts a status of a major system under control of the operator.

15. The method of claim 11, wherein the information rendered in the second display device corresponding to a desktop console screen is associated with a third level among the four levels and the second display device corresponding to the desktop console screen depicts detailed process displays that provide detailed views of sub units, equipment related controls, and indications.

16. The method of claim 11, wherein the information rendered in the second display device corresponding to a desktop console screen is associated with a third level among the four levels and the second display device corresponding to the desktop console screen depicts components that, when selected, allow the operator to view conditions for switching pumps, starting blowers, and operating valves.

17. The method of claim 11, wherein the information rendered in the second display device corresponding to a desktop console screen is associated with a fourth level among the four levels and the second display corresponding to the desktop console screen depicts detailed information related to a piece of equipment within a unit.

18. The method of claim 10, wherein a navigation icon is located on each of the plurality of display devices and the navigation menu is accessed by selecting the navigation icon.

19. The method of claim 10, wherein the information comprises an alarm indication, and further comprises determining a color intensity for displaying the alarm indication in the second display device based at least in part on an acknowledgement state for the alarm indication.

20. The method of claim 10, further comprising rendering, via the at least one computing device, at least one button icon adjacent to the navigation menu, the at least one button icon being used to cycle through a plurality of display names that correspond with the plurality of display devices.

* * * * *